US008458323B1

(12) United States Patent
Baader, II et al.

(10) Patent No.: US 8,458,323 B1
(45) Date of Patent: Jun. 4, 2013

(54) ASSOCIATING PROBLEM TICKETS BASED ON AN INTEGRATED NETWORK AND CUSTOMER DATABASE

(75) Inventors: Michael Joseph Baader, II, Sperryville, VA (US); Shane A. Lobo, Orlando, FL (US); Brian Lushear, Winter Springs, FL (US); Drew A. Shinholster, Jr., Maitland, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 849 days.

(21) Appl. No.: 12/546,351

(22) Filed: Aug. 24, 2009

(51) Int. Cl.
*G06F 15/173* (2006.01)

(52) U.S. Cl.
USPC .......................................... 709/224; 709/223

(58) Field of Classification Search
USPC ....................................................... 709/224
See application file for complete search history.

(56) References Cited

U.S. PATENT DOCUMENTS

| | | | |
|---|---|---|---|
| 5,825,775 | A | 10/1998 | Chin et al. |
| 5,898,826 | A | 4/1999 | Pierce et al. |
| 6,046,988 | A | 4/2000 | Schenkel et al. |
| 6,226,265 | B1 | 5/2001 | Nakamichi et al. |
| 6,393,483 | B1 | 5/2002 | Latif et al. |
| 6,570,867 | B1 | 5/2003 | Robinson et al. |
| 6,650,347 | B1 | 11/2003 | Nulu et al. |
| 6,700,967 | B2 | 3/2004 | Kleinöder et al. |
| 6,788,697 | B1 | 9/2004 | Aweya et al. |
| 6,792,273 | B1 | 9/2004 | Tellinger et al. |
| 6,813,634 | B1 | 11/2004 | Ahmed |
| 6,963,575 | B1 | 11/2005 | Sistanizadeh et al. |
| 6,973,042 | B1 | 12/2005 | Fitzgerald |
| 6,978,223 | B2 | 12/2005 | Milliken |
| 7,016,301 | B1 | 3/2006 | Moore |
| 7,099,305 | B1 | 8/2006 | Fardid |
| 7,099,912 | B2 | 8/2006 | Ishizaki et al. |
| 7,110,362 | B2 | 9/2006 | Kato |
| 7,143,152 | B1 | 11/2006 | Elman |
| 7,213,021 | B2 | 5/2007 | Taguchi et |
| 7,225,139 | B1 * | 5/2007 | Tidwell et al. ............... 705/7.15 |
| 7,376,719 | B1 | 5/2008 | Shafer et al. |
| 7,376,864 | B1 | 5/2008 | Hu et al. |
| 7,424,526 | B1 | 9/2008 | Hansen et al. |

(Continued)

OTHER PUBLICATIONS

Gonzalez, Jose, et al., "Virtual Link Mapping", U.S. Appl. No. 11/746,273, filed May 9, 2007.

(Continued)

*Primary Examiner* — Alina N Boutah
*Assistant Examiner* — Adam Cooney

(57) ABSTRACT

A system associates problem tickets based on an integrated network and customer database. A data retriever retrieves router configurations from data stores for routers in a service provider network. A data analysis tool parses the router configurations to create port data for each port on each router in the service provider network and integrates the port data with customer data to create an integrated database. The data analysis tool assigns ports to groups in the integrated database based on applying user defined rules. The data analysis tool accesses a problem management system to identify problem tickets that lack an association in the problem management system, and identifies ports associated with the problem tickets. The data analysis tool creates an association between the problem tickets if one of the groups includes the ports associated with the problem tickets. A user interface displays the created association between the problem tickets to troubleshoot associated tickets.

20 Claims, 6 Drawing Sheets

U.S. PATENT DOCUMENTS

| | | | |
|---|---|---|---|
| 7,464,152 | B2 | 12/2008 | Ishizaki et al. |
| 7,467,225 | B2 | 12/2008 | Anerousis et al. |
| 7,751,392 | B1 | 7/2010 | Gonzalez et al. |
| 7,830,816 | B1 | 11/2010 | Gonzalez et al. |
| 7,831,709 | B1 | 11/2010 | Ham et al. |
| 7,869,432 | B1 | 1/2011 | Mollyn |
| 7,904,533 | B1 | 3/2011 | Gonzalez et al. |
| 7,904,553 | B1 | 3/2011 | Ham et al. |
| 7,917,854 | B1 | 3/2011 | Beaudoin et al. |
| 7,940,676 | B2 | 5/2011 | Griffin |
| 7,983,174 | B1 | 7/2011 | Monaghan et al. |
| 8,139,475 | B2 | 3/2012 | Vercellone et al. |
| 2002/0022985 | A1 | 2/2002 | Guidice et al. |
| 2002/0078232 | A1 | 6/2002 | Simpson et al. |
| 2002/0087393 | A1 | 7/2002 | Philonenko |
| 2002/0101821 | A1 | 8/2002 | Feldmann et al. |
| 2002/0103631 | A1 | 8/2002 | Feldmann et al. |
| 2002/0103921 | A1 | 8/2002 | Nair et al. |
| 2002/0164007 | A1 | 11/2002 | Henits |
| 2002/0172148 | A1 | 11/2002 | Kim et al. |
| 2002/0181047 | A1 | 12/2002 | Lauder et al. |
| 2002/0186259 | A1 | 12/2002 | Meandzija et al. |
| 2003/0051195 | A1 | 3/2003 | Bosa et al. |
| 2003/0055972 | A1 | 3/2003 | Fuller et al. |
| 2003/0145072 | A1 | 7/2003 | Lau et al. |
| 2003/0154404 | A1 | 8/2003 | Beadles et al. |
| 2004/0006618 | A1 | 1/2004 | Kasai et al. |
| 2004/0010496 | A1 | 1/2004 | Behrendt et al. |
| 2004/0031059 | A1 | 2/2004 | Bialk et al. |
| 2004/0059781 | A1 | 3/2004 | Yoakum et al. |
| 2004/0064581 | A1 | 4/2004 | Shitama et al. |
| 2004/0071164 | A1 | 4/2004 | Baum |
| 2004/0139193 | A1 | 7/2004 | Refai et al. |
| 2004/0210621 | A1 | 10/2004 | Antonellis |
| 2004/0264484 | A1 | 12/2004 | Kui et al. |
| 2005/0022189 | A1 | 1/2005 | Proulx et al. |
| 2005/0027845 | A1 | 2/2005 | Secor et al. |
| 2005/0091482 | A1 | 4/2005 | Gray et al. |
| 2005/0094653 | A1 | 5/2005 | Milburn et al. |
| 2005/0240835 | A1 | 10/2005 | Dragnea et al. |
| 2006/0002401 | A1 | 1/2006 | Mukherjee et al. |
| 2006/0146694 | A1 | 7/2006 | Hamaguchi et al. |
| 2006/0167703 | A1 | 7/2006 | Yakov |
| 2006/0187855 | A1 | 8/2006 | Booth, III et al. |
| 2006/0215577 | A1 | 9/2006 | Guichard et al. |
| 2006/0268740 | A1 | 11/2006 | Rosenberg et al. |
| 2007/0041554 | A1 | 2/2007 | Newman et al. |
| 2007/0050497 | A1 | 3/2007 | Haley et al. |
| 2007/0053368 | A1 | 3/2007 | Chang et al. |
| 2007/0250625 | A1 | 10/2007 | Titus |
| 2007/0274285 | A1* | 11/2007 | Werber et al. ............... 370/351 |
| 2007/0280241 | A1 | 12/2007 | Verma |
| 2008/0002975 | A1 | 1/2008 | Vukovic et al. |
| 2008/0317039 | A1 | 12/2008 | Satterlee et al. |
| 2009/0067324 | A1 | 3/2009 | Licardie et al. |
| 2009/0198832 | A1 | 8/2009 | Shah et al. |
| 2009/0201911 | A1 | 8/2009 | DuPertuis et al. |
| 2009/0222547 | A1 | 9/2009 | Boylan et al. |
| 2009/0296588 | A1 | 12/2009 | Nishi et al. |
| 2010/0153537 | A1 | 6/2010 | Wang et al. |
| 2010/0195489 | A1 | 8/2010 | Zhou et al. |

OTHER PUBLICATIONS

Lobo, Shane A., et al., "Service Grouping for Network Reporting," U.S. Appl. No. 12/480,681, filed Jun. 8, 2009 A., et al., "Service Grouping for Network Reporting," U.S. Appl. No. 12/480,681, filed Jun. 8, 2009.

Office Action dated Jun. 9, 2011, U.S. Appl. No. 12/480,681, filed Jun. 8, 2009.

Office Action dated Mar. 2, 2009, U.S. Appl. No. 11/551,704, filed Oct. 21, 2006.

Final Office Action dated Aug. 13, 2009, U.S. Appl. No. 11/551,704, filed Oct. 21, 2006.

Office Action (Advisory Action) dated Oct. 16, 2009, U.S. Appl. No. 11/551,704, filed Oct. 21, 2006.

Office Action dated Dec. 31, 2009, U.S. Appl. No. 11/551,704, filed Oct. 21, 2006.

Office Action dated May 20, 2010, U.S. Appl. No. 11/551,704, filed Oct. 21, 2006.

Notice of Allowance dated Oct. 28, 2010, U.S. Appl. No. 11/551,704, filed Oct. 21, 2006.

Supplemental Notice of Allowance dated Dec. 8, 2010, U.S. Appl. No. 11/551,704, filed Oct. 21, 2006.

Office Action dated Jun. 15, 2009, U.S. Appl. No. 11/620,140, filed Jan. 5, 2007.

Final Office Action dated Nov. 27, 2009, U.S. Appl. No. 11/620,140, filed Jan. 5, 2007.

Advisory Action dated Feb. 17, 2010, U.S. Appl. No. 11/620,140, filed Jan. 5, 2007.

Notice of Allowance dated Mar. 22, 2010, U.S. Appl. No. 11/620,140, filed Jan. 5, 2007.

Office Action dated May 25, 2010, U.S. Appl. No. 11/746,273, filed May 9, 2007.

Final Office Action dated Nov. 19, 2010, U.S. Appl. No. 11/746,273, filed May 9, 2007.

Advisory Action dated Feb. 10, 2011, U.S. Appl. No. 11/746,273, filed May 9, 2007.

Office Action dated Mar. 31, 2011, U.S. Appl. No. 11/746,273, filed May 9, 2007.

Office Action dated Apr. 3, 2009, U.S. Appl. No. 11/838,175, filed Aug. 13, 2007.

Final Office Action dated Nov. 24, 2009, U.S. Appl. No. 11/838,175, filed Aug. 13, 2007.

Advisory Action dated Mar. 24, 2010, U.S. Appl. No. 11/838,175, filed Aug. 13, 2007.

Notice of Allowance dated Aug. 2, 2010, U.S. Appl. No. 11/838,175, filed Aug. 13, 2007.

Office Action—First Action Interview Pilot Program Pre-Interview Communication dated Apr. 2, 2010, U.S. Appl. No. 12/036,289, filed Feb. 24, 2008.

Notice of Allowance dated Jul. 26, 2010, U.S. Appl. No. 12/036,289, filed Feb. 24, 2008.

Notice of Allowance dated Oct. 15, 2010, U.S. Appl. No. 12/273,537, filed Nov. 18, 2008.

Supplemental Notice of Allowance dated Nov. 12, 2010, U.S. Appl. No. 12/273,537, filed Nov. 18, 2008.

Supplemental Notice of Allowance dated Jan. 10, 2011, U.S. Appl. No. 12/273,537, filed Nov. 18, 2008.

Office Action dated Nov. 1, 2011, U.S. Appl. No. 11/746,273, filed May 9, 2007.

Final Office Action dated Nov. 9, 2011, U.S. Appl. No. 12/480,681, filed Jun. 8, 2009.

Advisory Action dated Jan. 23, 2012, U.S. Appl. No. 12/480,681, filed Jun. 8, 2009.

Notice of Allowance dated Mar. 5, 2012, U.S. Appl. No. 12/480,681, filed Jun. 8, 2009.

Office Action—FAIPP dated Jul. 26, 2012, U.S. Appl. No. 12/639,906, filed Dec. 16, 2009.

Notice of Allowance dated Sep. 13, 2012, U.S. Appl. No. 12/639,906, filed Dec. 16, 2009.

Lushear, Brian D., "End-to-End Network Monitoring," U.S. Appl. No. 12/639,906, filed Dec. 16, 2009.

Pre-Interview Communication dated Jun. 15, 2012, U.S. Appl. No. 12/639,906, filed Dec. 16, 2009.

"traceroute", Wikipedia, http://en.wikipedia.org/w/index.php?title=Traceroute&printable=yes, Oct. 19, 2009, pp. 1-4, Wikipedia.org.

Notice of Allowance dated Jun. 8, 2012, U.S. Appl. No. 11/746,273, filed May 9, 2007.

* cited by examiner

| | Ticket 302 | Circuit Identifier 304 | Product 306 | Speed 308 | IP Address 310 | Street 312 | City 314 | Status 316 | Details 318 |
|---|---|---|---|---|---|---|---|---|---|
| 322 → | 9876, 9877 | 12345678900 | Global MPLS | 56 kbps | | 1022 M. St. SE | Newark, DE | Operational | Details |
| | 9877 | 12345678901 | SprintLinkATM | 4xT-1 | | 135 N. Penn St. | Newark, DE | Operational | Details |
| 324 { | | 12345678902 | | T-1 | | | | Operational | Details |
| | | 12345678903 | | T-1 | | | | Operational | Details |
| | | 12345678904 | | T-1 | | | | Operational | Details |
| | | 12345678905 | | T-1 | | | | Operational | Details |
| | | 12345678906 | Dedicated IP | | 144.19.144.5 | 1680 K. St. NW | Newark, DE | Operational | Details |
| 326 → | 9878, 9879 | 12345678907 | Global MPLS | T-1 | 171.05.95.144 | 8180 Upland Cir. | Newark, DE | Operational | Details |
| | | VRF Name   DLCI | | | | | | | |
| 328 { | 9878 | V608:check4 Voice31 | | | 171.09.0.171 | | | | Details |
| | 9879 | V604:check4 Data30 | | | 171.09.0.095 | | | | Details |
| 330 → | 9870, 9871 | 12345678908 | Global MPLS | 56 kbps | | 1 Boxridge Dr. | Newark, DE | Operational | Details |
| 332 → | 9871, 9870 | 12345678909 | Global MPLS | 56 kbps | | 1 Boxridge Dr. | Newark, DE | Operational | Details |

300

320 } (spans columns 310-318)

ASSOCIATING PROBLEM TICKETS BASED ON AN INTEGRATED NETWORK AND CUSTOMER DATABASE

CROSS-REFERENCE TO RELATED APPLICATIONS

This application includes subject matter related to the following applications, which are hereby incorporated by reference: U.S. patent application Ser. No. 11/551,704, filed Oct. 21, 2006, entitled "Integrated Network and Customer Database," by Jose Gonzalez, et al.; U.S. patent application Ser. No. 11/620,140, filed Jan. 5, 2007, entitled "Customer Link Diversity Monitoring," by Jose Gonzalez, et al.; U.S. patent application Ser. No. 11/838,175, filed Aug. 13, 2007, entitled "Network Access and Quality of Service Troubleshooting," by Jose Gonzalez, et al.; and U.S. patent application Ser. No. 12/036,289, filed Feb. 24, 2008, entitled "Flexible Grouping for Port Analysis," by David M. Ham, et al. and U.S. patent application Ser. No. 12/480,681, filed Jun. 8, 2009, entitled "Service Grouping for Network Reporting," by Shane A. Lobo, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network service provider may monitor the status of network devices through a network monitoring system that includes network data for network devices. A customer may use computers at a specific location for a specific purpose, such as communicating with the customer's other sales centers and distribution centers. The network monitoring system may not have customer data that would readily enable a technician or a customer to monitor the operation of network devices that provide service to the customer or to evaluate the effect of the network devices on communication with the customer's other sales centers and distribution centers.

SUMMARY

In some embodiments, a system is provided for associating problem tickets based on an integrated network and customer database. The system includes a processor, a data retriever, a data analysis tool, and a user interface. When executed by the processor, the data retriever retrieves router configurations from data stores for routers in a service provider network. When executed by the processor, the data analysis tool parses the router configurations to create port data for each port on each router in the service provider network and integrates the port data with customer data to create an integrated database. The data analysis tool assigns ports to groups in the integrated database based on applying a set of user defined rules, wherein at least one of the ports is assigned to multiple groups. The data analysis tool accesses a problem management system to identify a first problem ticket and a second problem ticket, wherein the first problem ticket lacks an association with the second problem ticket in the problem management system, and identifies a first port associated with the first problem ticket and a second port associated with the second problem ticket. If one of the groups includes the first port and the second port, the data analysis tool creates an association between the first problem ticket and the second problem ticket. The user interface displays the created association between the first problem ticket and the second problem ticket to troubleshoot associated tickets.

In some embodiments, a computer implemented method is provided for associating problem tickets based on an integrated network and customer database. Router configurations are retrieved from data stores for routers in a service provider network. The router configurations are parsed to create port data for each port on each router in the service provider network. The port data is integrated with customer data to create an integrated database. Ports are assigned to groups in the integrated database based on applying a set of user defined rules, wherein at least one of the ports is assigned to multiple groups. A problem management system is accessed to identify a first problem ticket and a second problem ticket, wherein the first problem ticket lacks an association with the second problem ticket in the problem management system. An identification is made of a first port associated with the first problem ticket and a second port associated with the second problem ticket. A determination is made whether one of the groups includes the first port and the second port. If one of the groups includes the first port and the second port, an association is created between the first problem ticket and the second problem ticket. The created association between the first problem ticket and the second problem ticket is displayed to troubleshoot associated tickets.

In some embodiments, a system is provided for associating problem tickets based on an integrated network and customer database. The system includes a processor, a data retriever, a data analysis tool, and a user interface. When executed by the processor, the data retriever retrieves router configurations from data stores for routers in a service provider network. When executed by the processor, the data analysis tool parses the router configurations to create port data for each port on each router in the service provider network, and integrates the port data with customer data to create an integrated database. The data analysis tool identifies ports associated with a customer, identifies the ports associated with the customer which are bundled into bundled logical ports and the bundled logical ports as a first service group, and identifies the ports associated with the customer which are partitioned into partitioned logical ports and the partitioned logical ports as a second service group. The data analysis tool accesses a problem management system to identify a first problem ticket and a second problem ticket, wherein the first problem ticket lacks an association with the second problem ticket in the problem management system, and identifies a first port associated with the first problem ticket and a second port associated with the second problem ticket. If one of the first service group and the second service group includes both the first port and the second port, the data analysis tool creates an association between the first problem ticket and the second problem ticket. The user interface displays the created association between the first problem ticket and the second problem ticket to troubleshoot associated tickets.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description.

FIG. 3 shows a frame of a graphical user interface for associating problem tickets based on an integrated network and customer database according to some embodiments of the present disclosure.

DETAILED DESCRIPTION

Figure 1:
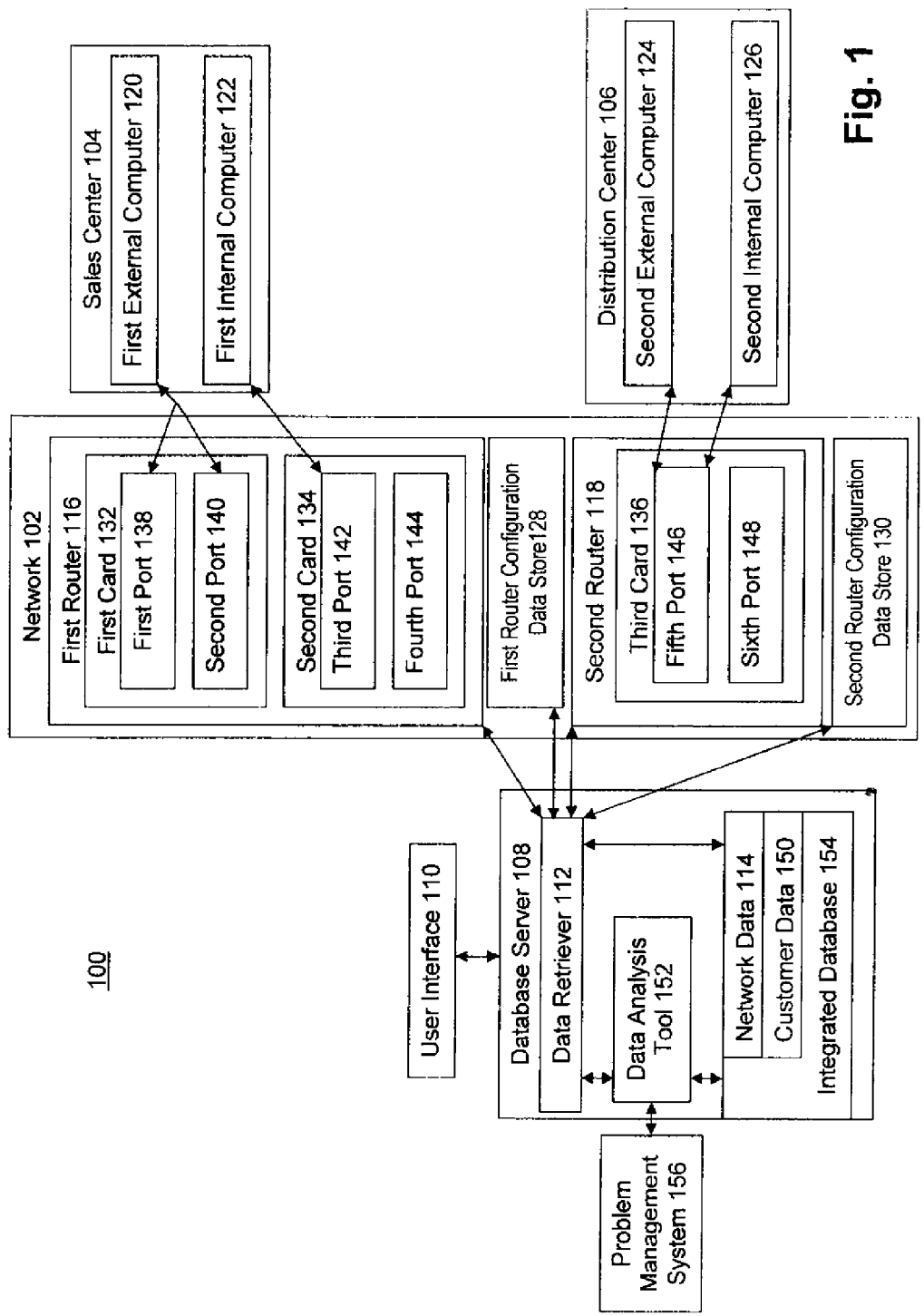
FIG. 1 is a block diagram of an illustrative system for associating problem tickets based on an integrated network and customer database according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Although a problem management system may identify some problem tickets as unrelated to each other, in some circumstances the problem tickets may actually be related to each other. For example, if the network problem tickets are based on two ports that are bundled together in a service group, the separately reported errors that are documented in unrelated problem tickets may be caused by a single problem. In another example, if the network problem tickets are based on one port that is partitioned, the seemingly unrelated problem tickets may be caused by a single problem, for example a failure of the single port. Identifying relationships between apparently unrelated problem tickets may enable a technician to attempt troubleshooting solutions that may not have been attempted otherwise.

A monitoring system that associates problem tickets based on an integrated network and customer database is provided to enable a customer to monitor a service provider network based on groups of customer links. A port is the physical interface between a router and a circuit or cable. A customer link is the collection of all the circuits and ports that are between two end points that enable communication between those end points. For many instances, a customer link comprises a single circuit and a single port. However, some network services may bundle two or more smaller circuits to create a larger virtual circuit. These bundles may be associated with two or more ports. All of the ports providing a bundled service may be located on the same router card. The monitoring system determines which ports provide a bundled service and treats those ports accordingly. The monitoring system also allocates every port into customer links.

The monitoring system retrieves router configuration data to create an integrated database. The monitoring system accesses network information in router configuration data stores instead of directly accessing routers, thus eliminating the possibility of interfering with router operation. After the monitoring system retrieves the network information from the router configuration data stores, the system integrates the network information with customer information to create an integrated database for subsequent access.

A data analysis tool may assign ports to groups in the integrated database based on applying a set of user defined rules, wherein at least one of the ports is assigned to multiple groups. The user defined rules may be based on network information, customer information, or a combination of network information and customer information. In one example, a supervisor of a network service provider account with a customer defines rules to assign all of the customer's ports to a customer group. In another example, a technician who supports one of the customer's locations defines rules to assign the customer's ports at that location to a customer location group. In yet another example, a salesman who sold ports to the customer, which enable the customer to create a specialized customer network between different locations, defines rules to assign the customer's specialized network ports to a customer network group. Some of the customer's ports may be assigned to multiple groups. For example, while the system provides port data for a port to the customer group, the system also provides the same port data for the same port to the customer network group.

The data analysis tool accesses a problem management system and identifies multiple problem tickets, such as a first problem ticket and a second problem ticket, that lack an association with each other in the problem management system. The data analysis tool also identifies ports associated with the problem tickets, such as a first port associated with the first problem ticket and a second port associated with the second problem ticket. The data analysis tool may determine whether one of the user defined groups includes the ports, and create an association between the problem tickets if one of the user-defined groups includes the ports. For example, the data analysis tool determines that the customer location group created by the technician includes the first port and the second port, and creates an association between the first problem ticket and the second problem ticket based on the common customer location group. The user interface displays the created association between the problem tickets to troubleshoot associated tickets. For example, instead of assigning the previously unassociated problem tickets to two different technicians, the data analysis tool assigns the two problem tickets to the same technician to troubleshoot at the location associated with the customer location group. The assigned technician may identify a common solution for the previously unassociated problem tickets.

In addition to determining whether a user-defined group includes the previously unassociated problem tickets, the data analysis tool also may identify service groups and determine whether a service group includes the previously unassociated problem tickets. The data analysis tool may identify ports associated with a customer, identify the ports that are bundled into bundled logical ports and the bundled logical ports as a bundled service group, and identify the ports that are partitioned into partitioned logical ports and the partitioned logical ports as a partitioned service group. For example, the data analysis tool may identify that a customer purchased services supported by three physical ports. Each of the first two physical ports provides the capability for a data service to communicate at 1.5 megabits per second, and may be bundled into a bundled logical port that provides the capability for a high-speed data service group to communicate at 3.0 megabits per second. An internal-external service group may include the third physical port which is partitioned into two partitioned logical ports, with one of the partitioned logical ports enabling internal network communication and the other partitioned logical port enabling external internet access.

The data analysis tool accesses a problem management system and identifies multiple problem tickets, such as a first problem ticket and a second problem ticket, that lack an association with each other in the problem management system. The data analysis tool also identifies ports associated with the problem tickets, such as a first logical port associated with the first problem ticket and a second logical port associated with the second problem ticket. The data analysis tool may determine whether one of the service groups includes the ports, and creates an association between the problem tickets if one of the service groups includes the ports. For example, the data analysis tool determines that the internal-external service group includes the third physical port that is partitioned into both the first logical port and the second logical port, and creates an association between the first problem ticket and the second problem ticket based on the common service group. The user interface displays the created association between the problem tickets to troubleshoot associated tickets. For example, instead of assigning the previously unrelated problem tickets to two different technicians, the data analysis tool assigns the two problem tickets to the same technician to troubleshoot at the location associated with the third physical port. The cause of the problem for the tickets may be related to the physical port that is partitioned into the first logical port and the second logical port. The data analysis tool also may change the priority for at least one of the previously unassociated problem tickets based on the created association, which enables the technician to address a problem that may not have been evident if the problems were addressed separately. The data analysis tool associates previously unassociated problem tickets to promote troubleshooting solutions that may not have been attempted otherwise.

Turning now to FIG. 1, a monitoring system 100 for associating problem tickets based on an integrated network and customer database is depicted. The numbers of each type of component in the system 100 are depicted in FIG. 1 for the purpose of illustration, but the system 100 may include any number of each component type. The system 100 includes a network 102, a sales center 104, a distribution center 106, a database server 108, and a user interface 110. The network 102 enables communications for the centers 104-106. Although described as the sales center 104 and the distribution center 106, the centers 104-106 may be any type of centers 104-106. The database server 108 monitors communications by the centers 104-106 on the network 102. The user interface 110 enables a user to interface with the database server 108.

The database server 108 stores data retrieved by a data retriever 112 that accesses the network 102. The data retriever 112 retrieves network data 114 from network devices, such as a first router 116 and a second router 118 that communicate as part of the network 102. The network data 114 may include data that identifies which routers, cards, and ports are connected to which customers at which locations. The network 102 may include thousands of routers 116-118 for routing messages between computers. Each router 116-118 forwards data packets across the network 102 toward their destinations. For example, the first router 116 sends and receives data packets for a first external computer 120 and a first internal computer 122 at the sales center 104; and the second router 118 sends and receives data packets for a second external computer 124 and a second internal computer 126 at the distribution center 106.

The sales center 104 may use the first external computer 120 to communicate with external customer computers over an external network, such as the internet. The sales center 104 may use the first internal computer 122 to communicate in a customer network with other internal customer computers, such as the second internal computer 126 at the distribution center 106. The distribution center 106 may use the second external computer 124 to communicate with external customer computers over an external network, such as the internet. The distribution center 106 may use the second internal computer 126 to communicate in the customer network with other internal customer computers, such as the first internal computer 122 at the sales center 104.

The network data 114 may include data for multiple networks 102, with each network 102 including any number of routers 116-118 and data for each of the routers 116-118. The network data 114 may be compiled from router configuration data that is stored off-line in a data store as a recovery file to enable a router to recover after power outages or router maintenance. The router configuration data may indicate which customer computer is linked to which port on which card for which router. The router configuration data for the first router 116 may be stored in a file in non-volatile memory in a first router configuration data store 128. The first router configuration data store 128 may be a backup data store associated with or on board the first router 116. Similarly, the router configuration data for the second router 118 may be stored in a file in non-volatile memory in a second router configuration data store 130. By accessing router configuration data in the first router configuration data store 128 and the second router configuration data store 130, the data retriever 112 has the option of not directly accessing the first router 116 or the second router 118. Not directly accessing routers reduces the possibility of interfering with router operation. The on-line routers 116-118 may store their router configuration data in the off-line backup data stores 128-130 periodically, such as each day when throughput is low. The network data 114 may alternatively be in part compiled from the router configuration data that is used by the routers 116-118.

The first router 116 includes a first card 132 and a second card 134, and the second router 118 includes a third card 136. Each card 132-136 may include multiple ports that each link with a customer computer. For example, the first card 132 includes a first port 138 and a second port 140, the second card 134 includes a third port 142 and a fourth port 144, and the third card 136 includes a fifth port 146 and a sixth port 148. One customer may have multiple customer computers that link to the network 102 through the routers 116-118. The sales center 104 for the customer includes the first external computer 120 linked to both the first port 138 and the second port 140 on the first card 132 on the first router 116, and the first internal computer 122 linked to the third port 142 on the second card 134 on the first router 116. Additionally, the distribution center 106 for the customer includes the second external computer 124 linked to the fifth port 146 on the third card 136 on the second router 118 and the second internal computer 126 also linked to the fifth port 146 on the third card 136 on the second router 118. The database server 108 stores the network data 114 separate from customer data 150, which may be entered from the user interface 110.

The database server 108 includes a data analysis tool 152 that integrates the network data 114 with the customer data 150 to create an integrated database 154. The network data 114 includes the port data for the individual ports 138-148.

The data analysis tool 152 may receive input from the user interface 110 and a problem management system 156, and display the network data 114 and the customer data 150 from the integrated database 154 on the user interface 110 and via the problem management system 156. The data retriever 112 retrieves the network data 114 from the network 102 to provide to the data analysis tool 152 to store in the integrated database 154. Although depicted as retrieving the network data 114 from only one network, the network 102, the data retriever 112 may retrieve the network data 114 from any number of networks 102. Likewise, the data analysis tool 152 may integrate the network data 114 from any number of networks 102 with the customer data 150 to create the integrated database 154.

The data analysis tool 152 may assign ports to groups in the integrated database based on applying a set of user defined rules, wherein at least one of the ports is assigned to multiple groups. For example, the data analysis tool 152 assigns the ports 138, 140, 142, and 146 to a customer group based on applying a set of supervisor-defined rules that are based on all of the customer's ports. In another example, the data analysis tool 152 assigns the ports 138, 140, and 142 to a sales location group based on applying a set of technician-defined rules that are based on all of the customer's ports serving the sales center 104. In yet another example, the data analysis tool 152 assigns the ports 142 and 146 to the customer network group based on applying a set of salesman-defined rules that are based on all of the customer ports that serve the internal computers 122 and 126. The data analysis tool 152 may apply each set of user-defined rules on every occasion when the network data 114 and/or the customer data 150 changes. For example, in response to the technician adding a new port, the data analysis tool 152 applies the supervisor's defined rules to the new port to assign the new port to the sales location group.

The data analysis tool 152 may assign a port to the group if each rule applies to the port or if one of the set of rules applies to the port. For example, the data analysis tool 152 may assign the ports 138, 140, and 142 to a "Great Corp. sales location" group because the rule defining "Great Corp." as the customer name and the rules defining "530254," "530255," and "530256" as the private lines for the sales center 104 applies to the ports 138, 140, and 142. In another example, the data analysis tool 152 assigns the ports 142 and 146 to the customer network group because either the rule defining "530254-002" as the network address or the rule defining "530265-001" as the network address applies to the ports 142 and 146. The data analysis tool 152 may identify ports for exclusion from a group. For example, the data analysis tool 152 initially assigns the ports 138, 140, 142, and 146 to the sales location group based on rules defining private lines for the sales center 104 and the distribution center 106, but then the data analysis tool 152 excludes the port 146 from the sales location group based on rules defining the network addresses for the port 146 for exclusion. Exclusion rules enable a user to more easily define some groups by initially defining a larger group of ports than desired for the group and then selecting to exclude some of the ports in the larger group of ports.

The user of the system 100 may define the rules for ports based on a customer full name, a customer short name, a remote side internet protocol address, a network address number, a private line number, an interface description, a remote border gateway protocol autonomous system number, a router and interface name, a support office indicator code, and/or a multiprotocol label switching virtual routing and forwarding name. The customer full name is an identifier for a customer, such as "Great Gadgets Corporation." The customer short name is an identifier for a sub-portion of a customer, such as "Great Corp. sales location." The remote side internet protocol address identifies a connection used by the customer, such as "10.111.12.230/30." The network address number and the private line number are internal billing identifiers used by database applications, such as "530254-002" and "530179." The interface description is a text identifier stored by a router for a port, such as "Great Corp. 530179." The remote border gateway protocol autonomous system number is a routing protocol number for a collection of internet protocol networks and routers under the control of one or more entities that presents a common routing policy to the internet, such as "15169." The router and interface name is an identifier for a router to a customer, such as "Serial5/1/0/18.0." The support office indicator code is an identifier used by a network service provider to specify individuals responsible for the sale and/or the support of a port. The multiprotocol label switching (MPLS) virtual routing and forwarding (VRF) name is a name used to distinguish traffic in a MPLS. The VRF name may comprise both letters and numerals. In an embodiment, the virtual routing and forwarding name may be a number.

The data analysis tool 152 may create a rule that corresponds to individual ports. For example, if a user is interested in monitoring ports that have experienced problems within the last month, the user may have difficulty in defining rules that identify these specific ports. Therefore, the user may enter identifiers for each individual port that the user is interested in monitoring. The data analysis tool 152 responds to the entry of these individual ports by creating a custom rule that identifies the ports and enables the user to name the custom rule. For example, a user may copy a list of private line numbers and network addresses from a report identifying ports with problems over the last month, and paste the list into an entry field for multiple ports. In response, the data analysis tool 152 creates a rule for the ports listed in the entry field, creates a group based on the created rule, and prompts the user to name the created group.

The data analysis tool 152 accesses the problem management system 156 and identifies multiple problem tickets, such as a first problem ticket and a second problem ticket, that lack an association with each other in the problem management system 156. When viewing the problem tickets via the problem management system 156, a user may see that the problem tickets were opened at different times for different reasons. Because the problem management system 156 has no knowledge of the layout of the network 102, the problem management system 156 may not indicate that the problem tickets are affecting the same user-defined group or service group.

The data analysis tool 152 identifies ports associated with the problem tickets, such as a first port associated with the first problem ticket and a second port associated with the second problem ticket. The data analysis tool 152 may determine whether one of the user-defined groups includes the ports, and creates an association between the problem tickets if one of the user-defined groups includes the ports. For example, the data analysis tool 152 determines that the technician-defined sales location group includes both the first port and the second port, and creates an association between the first problem ticket and the second problem ticket based on the common sales location group. The user interface 110 displays the created association between the problem tickets to troubleshoot associated tickets. For example, instead of assigning the previously unrelated problem tickets to two different technicians, the data analysis tool 152 assigns the two problem tickets to the same technician to troubleshoot at the location associated with the sales location group. The technician may identify a common solution for the previously unassociated problem tickets.

Each of the problem tickets may be based on a current problem or a historical problem for which the problem ticket has been completed. For example, the first problem ticket may be based on a problem with the first port that was corrected yesterday and the second problem ticket may be based on a current problem with the second port. Because the two ports that are associated with the tickets are in the same sales location group, the technician assigned to work on the second problem ticket today may need to know about the problem with the first port that was corrected yesterday because such information may assist the technician in determining whether the cause of the problem for the second port is related to the cause of the problem for the first port.

In addition to determining whether a user-defined group includes the previously unassociated problem tickets, the data analysis tool 152 may also identify service groups and determine whether a service group includes the previously unassociated problem tickets. The data analysis tool 152 may identify the ports associated with a customer, identify the ports that are bundled into bundled logical ports and the bundled logical ports as bundled service groups, and identify the ports that are partitioned into partitioned logical ports and the partitioned logical ports as partitioned service groups. For example, the data analysis tool 152 may identify that a customer purchased services supported by four physical ports 138, 140, 142, and 146. The services may be a voice communication service, a data communication service, a frame relay service, and/or an asynchronous transfer mode service.

For example, each of the physical ports 138 and 140 that provide the capability for a data service to communicate at 1.5 megabits per second may be bundled into a bundled logical port that provides the capability for a high-speed data service to communicate at 3.0 megabits per second for a data service. The data analysis tool 152 may identify the physical ports 138 and 140 and the bundled logical port as a bundled service group for the first external computer 120.

The physical port 146 may be partitioned into two partitioned logical ports, with one of the partitioned logical ports enabling internal network communication for the second internal computer 126 and the other partitioned logical port enabling external internet access for the second external computer 124. The partitioned logical ports may be separated by a firewall that enables the physical port 146 to provide two different services to the computers 124 and 126. The data analysis tool 152 may identify the physical port 146 and the partitioned logical ports as a partitioned service group for the computers 124 and 126.

The service groups may include a parent port that is associated with a child port. The data analysis tool 152 may determine parent ports and child ports based on applying a set of rules to the customer's ports and the customer services provided by a customer's ports. The data analysis tool 152 may also display port information via the user interface 110 to enable a user to determine the parent ports and the child ports based on the customer's ports and the customer services provided by the customer's ports. For example, the data analysis tool 152 creates a bundled service group that depicts the bundled logical port that provides the capability to communicate at 3.0 megabits per second for a data service as a parent port and each of the unbundled physical ports 138 and 140 that provide the capability to communicate at 1.5 megabits per second as the children ports.

The customer may initially view the bundled logical port for the data service that communicates at 3.0 megabits per second as a parent port. For example, the customer may view the bundled service group and notice that the bundled logical port is communicating at significantly less than 3.0 megabits per second even though the bandwidth allocation for this port is for 3.0 megabits per second. In response to noticing this, the customer may select for the bundled logical port to display the children ports of this parent port. If the customer views the children ports of the selected parent port, the customer may notice that the unbundled physical port 138 is communicating at significantly less than 1.5 megabits per second, which may be the cause for the bundled logical port communicating at significantly less than 3.0 megabits per second.

The service groups may include a first peer port that relates to a second peer port based on the service provided to the customer. For example, a first peer port may be a port associated with inbound communications for a gateway and a second peer port may be a port associated with outbound communications for the gateway. A service group may depict one of the peer ports as a parent port and the other peer port as a child port. The customer may view one of the peer ports as a parent port, and the customer may select for the peer port to display the child port of this parent port. In response to this selection of the parent port, the customer may view the other peer port as a child port of the selected parent port.

The data analysis tool 152 accesses the problem management system 156 and identifies multiple problem tickets, such as a first problem ticket and a second problem ticket, that lack an association with each other in the problem management system 156. The data analysis tool 152 also identifies ports associated with the problem tickets, such as a first logical port associated with the first problem ticket and a second logical port associated with the second problem ticket. The data analysis tool 152 may determine whether one of the service groups includes the ports, and create an association between the problem tickets if one of the service groups includes the ports. For example, the data analysis tool 152 determines that the internal-external service group includes the port 146 that is partitioned into both the first logical port and the second logical port, and creates an association between the first problem ticket and the second problem ticket based on the common service group. Alternatively, upon identifying a new problem ticket, the problem management system 156 may request the data analysis tool 152 to identify ports associated with the new problem ticket and other problem tickets, determine whether one of the service groups includes the ports, and create an association between the problem tickets if one of the service groups includes the ports. The user interface 110 displays the created association between the problem tickets to troubleshoot associated tickets. For example, instead of assigning the previously unrelated problem tickets to two different technicians, the data analysis tool 152 assigns the two problem tickets to the same technician to troubleshoot at the location associated with the port 146. In another example, the data analysis tool 152 may request the problem management system 156 to assign the two problem tickets to the same technician to troubleshoot at the location associated with the port 146. The cause of the problem for the tickets may be related to the physical port 146 that is partitioned into the first logical port and the second logical port. The data analysis tool 152 also may change the priority for at least one of the previously unassociated problem tickets based on the created association, which enables the technician to address a problem that may not have been evident if the problems were addressed separately. The data analysis tool 152 associates previously unassociated problem tickets to promote troubleshooting solutions that may not have been attempted otherwise.

Figure 2:
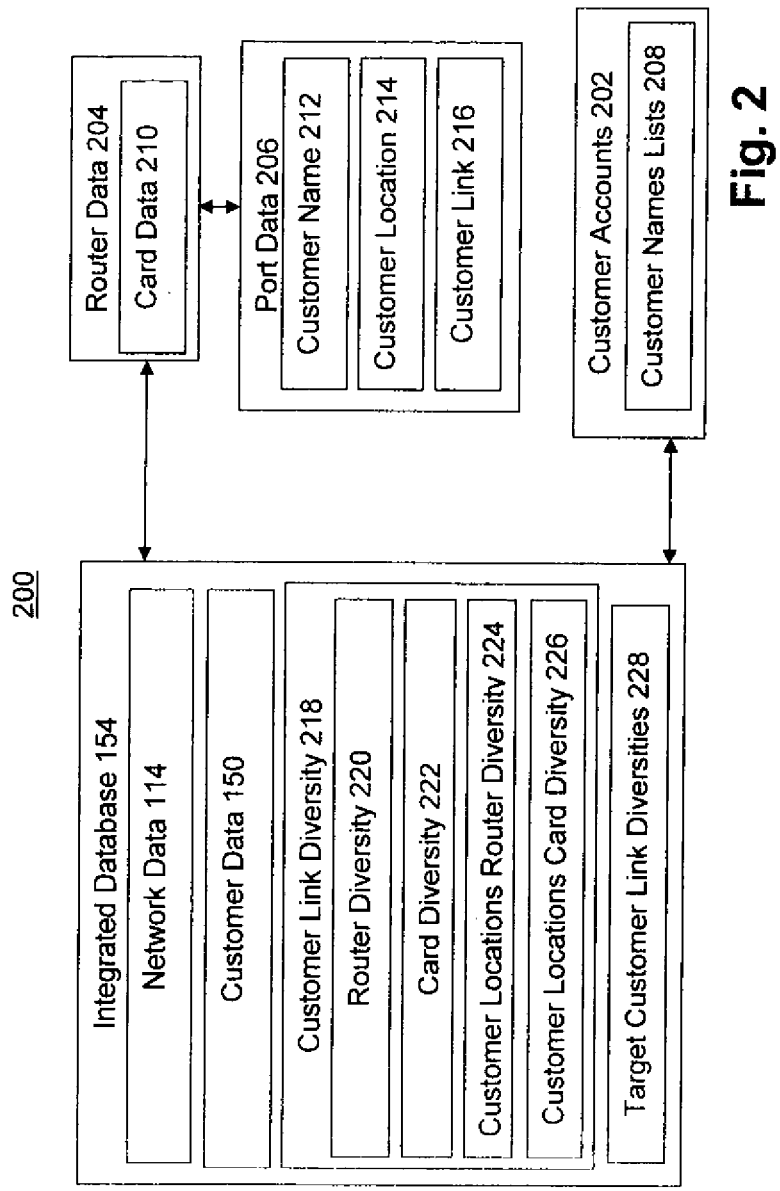
FIG. 2 shows a schema for an integrated database for associating problem tickets based on an integrated network and customer database according to some embodiments of the present disclosure.

Turning now to FIG. 2, a schema 200 for the integrated database 154 for associating problem tickets based on an integrated network and customer database is depicted according to some embodiments of the present disclosure. The schema 200 includes the integrated database 154, customer accounts 202, router data 204, and port data 206. The integrated database 154 includes the network data 114 and the customer data 150. The customer data 150 is related to the customer accounts 202, which may be a customer database that includes business information, such as billing plans, billing information, and customer names lists 208.

Each of the customer names lists 208 includes a list of one or more customer names used by a specific customer. For example, "Great Gadgets Corporation," "Great Gadgets Corp.," "Great Gadgets," and "Great Corp." may be customer names used by the customer Great Gadgets Corporation. In contrast, "Great Games Company." is a customer name used by a customer that is unrelated to the customer Great Gadgets Corporation. The integrated database 154 uses the customer names lists 208 to integrate the network data 114 with the corresponding customer in the customer data 150. For example, the network data 114 for "Great Gadgets Corporation," "Great Gadgets Corp.," "Great Gadgets," and "Great Corp." are integrated with the customer data 150 for the customer Great Gadgets Corporation, but the network data 114 for "Great Games" is integrated with the customer data 150 for a different customer. The integrated database 154 may present customer names from the customer names lists 208 to a user through the user interface 110 to enable the user to select which customer names in the customer names lists 208 correspond to which customers.

The network data 114 includes router data 204, which includes network information, such as card data 210 for a specific router. The network data 114 may include data for multiple networks, with each network including any number of routers and data for each of the routers. The router data 204 may be based on router configuration data that is stored offline in a data store as a recovery file to enable a router to recover after power outages or router maintenance.

The router data 204 includes the card data 210, and the card data 210 includes the port data 206, which may include connectivity information that specifies which specific ports located on specific cards are connected to which customer locations. The data retriever 112 retrieves the router data 204, which the database server 108 parses to determine the card data 210 and the port data 206 related to the card data 210. Only one instance of the port data 206 is depicted for the purpose of illustration, but each card may include multiple ports and the card data 210 may be related to instances of the port data 206 for each port.

The port data 206 includes a customer name 212, a customer location 214, and a customer link 216. The port data 206 also may include customer bandwidth, status, configuration, and data output. The integrated database 154 uses the customer name 212 for a specific port with the customer names lists 208 to determine to which customer the specific port corresponds. By determining which specific ports correspond to which customers, the database server 108 may respond to a selection through the user interface 110 of a specific service group of customer ports by displaying the port data 206 for each port that corresponds to the specific customer service group.

The customer location 214 may include a geographic location for a specific router, such as New York, Chicago, or Atlanta. The customer location 214 also may include the street address for a customer linked to a specific router. By relating the customer location 214 for each router to a customer, the integrated database 154 may display the router data 204 for each router related to the customer that is at a general or specific location selected through the user interface 110. For example, if a user requests to view port information for ports that identify Atlanta as a general location and "Great Gadgets Corporation" as a customer, the integrated database 154 displays the router data 204 for each of the customer Great Gadgets Corporation's routers that are located in Atlanta. The customer link 216 may define the end points of the communication link, for example between a collections computer at a billing center at a first end of the communication link and a port on a specific card of a specific router at a second end of the communication link.

In yet another example, parsing the router data 204 may determine the port data 206 that specifies the customer name 212 for a port is "Great Corp." and the customer link is between the first external computer 120 at the sales center 104 and both the first port 138 and the second port 140 on the first card 132 on the first router 116. As a further example, parsing the router data 204 may determine the customer location 214 that specifies Chicago as the geographic location for the router that contains the port and the customer link is between the first internal computer 122 at the sales center 104 and the third port 142 on the second card 134 on the first router 116. In an additional example, the port data 206 related to the network data 114 specifies that the customer name 212 for the first port 138 is "Great Corp.," and the port data 206 related to the network data 114 specifies that the customer name 212 for the second port 140 is "Great Corp." For this example, the database server 108 integrates the port data 206 for the first port 138 and the port data 206 for the second port 140 with the customer data 150 for the customer Great Gadgets Corporation. The database server 108 stores this integrated network data 114 and customer data 150 in the integrated database 154. The integrated database 154 may include network data 114 that is both current and historical data. Because a customer may communicate through multiple networks from the same location, the integrated database 154 may display the name of the corresponding network along with the router data 204 for each router.

A service group may be based on a collection of ports that provide diverse customer links to a customer. For example, the data analysis tool 152 assigns the ports 138, 140, 142, and 146 to a "Great Corp." group based on applying a set of technician-defined rules that are based on all of Great Corp.'s ports serving the sales center 104 and the distribution center 106. The four computers 120-126 at the sales center 104 and the distribution center 106 have four customer links to the network 102. The first customer link is between the first external computer 120 at the sales center 104 and the first card 132, the second customer link is between the first internal computer 122 at the sales center 104 and the second card 134, the third customer link is between the second external computer 124 at the distribution center 106 and the third card 136, and the fourth customer link is between the second internal computer 126 at the distribution center 106 and the third card 136. Therefore, three cards 132-136 support the four computers 120-126, such that if any one of the three cards 132-136 was to fail, two of the cards 132-136 would remain to support the four computers 120-126. Therefore, if one of the cards 132-136 failed, Great Corp. would not be dependent upon any single card to maintain at least some communications at the centers 104-106. This example illustrates the concept of customer link diversity for cards, such that the failure of any one card does not terminate communications for a customer. A customer may be willing to pay for maintaining such a customer link diversity that reduces the chance of terminated communications.

However, multiple problem tickets, such as a first problem ticket and a second problem ticket, that lack an association with each other in the problem management system 156 may cause problems for maintaining a customer link diversity. For example, if the failure of the first card 132 creates the first problem ticket and the failure of the third card 136 creates the second problem ticket, these problem tickets would lack an association with each other in the problem management system 156. However, the impact of these card failures would leave the second card 134 as the only functioning card supporting communications for Great Corp.'s four computers 120-126. Such a situation would significantly reduce Great Corp's customer link diversity for cards, which would reflect the complete dependence upon a single piece of hardware, the second card 134, for continued communications. Because Great Corp. may be paying to maintain this customer link diversity, a technician would need to be alerted about this situation in which Great Corp. depends upon a single piece of hardware for communication.

Therefore, the data analysis tool 152 may identify ports associated with the problem tickets, such as the ports 138 and 140 on the first card 132 associated with the first problem ticket and the ports 146-148 on the third card 136 associated with the second problem ticket. The data analysis tool 152 may determine whether one of the service groups includes the ports, and create an association between the problem tickets if one of the service groups includes the ports. For example, the data analysis tool 152 determines that the Great Corp. service group includes the ports 138-140 on the first card 132 and the ports 146-148 on the third card 136, and creates an association between the first problem ticket and the second problem ticket based on the common service group. If the data analysis tool 152 determines a customer link diversity based on the failure of the first card 132 and the third card 136, and determines that the diversity falls below its corresponding target customer link diversity, the system 100 may alert a user and may recommend a corrective action to take, such as assigning a higher priority to repair at least one of the failed cards 132 and 136. By identifying relationships between apparently unrelated problem tickets, the data analysis tool 152 may enable a technician to attempt troubleshooting solutions that may not have been attempted otherwise.

The data analysis tool 152 may parse multiple instances of the router data 204 to determine a customer link diversity 218 based on the integrated database 154. Examples of the customer link diversity 218 include router diversity 220, card diversity 222, customer locations router diversity 224, and customer locations card diversity 226. The integrated database 154 also may include target customer link diversities 228, which may include a corresponding value for each of the determined customer link diversities. The target customer link diversities 228 may be assigned by a customer or by the user of the system 100 based on the needs of each customer. Examples of the diversities 220-228 are discussed below. The diversities 220-226 indicate the probability that any hardware failure will impact multiple ports. The system 100 may monitor whether the diversities 220-226 are maintained above the target customer link diversities 228. If the system 100 determines that any of the diversities 220-226 fall below their corresponding target customer link diversities 228, the system 100 may alert a user and may recommend a corrective action to take, such as reassigning a customer link.

FIG. 3 shows a frame 300 of a graphical user interface for associating problem tickets based on an integrated network and customer database according to some embodiments of the present disclosure. The numbers and types of each element in FIG. 3 are depicted for the purpose of an illustrative example, as the frame 300 may include any number and type of elements. Additionally, the graphic user interface may contain other frames and control elements. The database server 108 may provide the frame 300 via the user interface 110 to enable a user to promote troubleshooting ports. The frame 300 depicts a hierarchy of port information that includes a ticket 302 column, a circuit identifier column 304, a product column 306, a speed column 308, an IP address column 310, a street column 312, a city column 314, a status column 316, a details column 318, and rows 320 that correspond to each of the columns 302-318.

The ticket column 302 list any tickets associated with a corresponding port. The circuit identifier column 304 displays the identifier for the circuit for a corresponding port. The circuit identifier column 304 may display the virtual private network routing and forwarding technology identifier and the data link connection identifier for a corresponding port in a virtual private network. The product column 306 displays products that provide customer service for corresponding ports. The product column 306 may display whether a corresponding port is a logical port or a physical port. The speed column 308 displays allocated bandwidth for corresponding ports. The IP address column 310 displays the internet protocol address for corresponding ports. The IP address column 310 may display the internet protocol address for corresponding children ports.

The street column 312 displays the physical street address, such as "8180 Upland Cir.," associated with corresponding ports. The city column 314 displays the city, such as "Newark, Del.," associated with corresponding ports. The status column 316 displays whether a corresponding port is operational or not. The details column 318 displays operational details for a corresponding port, such as a current rate of communication.

The frame 300 may depict a defined group of ports that includes all of the ports in a specific group, such as ports in a user-defined group or a service group, for a customer and display created associations between problem tickets. A user may enter inputs via the user interface 110 for the frame 300 to display ports associated with user-defined groups, service groups, trouble tickets, or any combination thereof. The frame 300 displays associations of ports with trouble tickets that may not be possible in the problem management system 156 because the problem management system 156 has no overall knowledge of the network 102.

For example, the frame 300 depicts that the port 322 is a bundled logical port that provides a communication speed that is equivalent to four T-1 lines, which are also known as digital signal 1 lines, and the ports 324 are the physical ports that each provides a T-1 line for the port 322. The data analysis tool 152 generated ticket number 9876 for the port 322 when the communication speed for the port 322 dropped below a predetermined threshold level. The problem management system 156 generated ticket number 9877 for the first of the physical ports 324 when a customer at 135 North Penn Street called in a problem. Because the problem management system 156 has no knowledge of the layout for the network 102, the problem management system 156 may have assigned the ticket numbers 9876 and 9877 to be worked independently of each other.

However, because the data analysis tool 152 identifies that the first of the physical ports 324 is bundled to provide the logical port 322, the data analysis tool 152 associates the ticket number 9877 for the first of the physical ports 324 with the ticket number 9876 for the port 322 in the ticket column 302 for the port 322. The cause of the problem for the ticket numbers 9876 and 9877 may be related to a network element that bundles the physical ports 324 into the port 322. A user of the system 100 may view the frame 300 to identify the association between the ticket numbers 9876 and 9877 to troubleshoot these associated tickets in a coordinated manner by identifying a common solution for the first problem ticket and the second problem ticket. Additionally, the data analysis tool 152 may provide the association between the ticket numbers 9876 and 9877 to the problem management system 156 to enable the assignment of troubleshooting these associated tickets in a coordinated manner.

In another example, the port 326 is a physical port that is partitioned into two logical partitioned ports 328 to provide both voice and data communication for the customer's location. The data analysis tool 152 generated ticket number 9879 for the partitioned logical data port when the number of errors for the partitioned logical data port rose above a predetermined threshold level. The problem management system 156 generated ticket number 9878 for the partitioned logical voice port when a customer at 8180 Upland Circle called in a problem with phone service. Because the problem management system 156 has no knowledge of the layout for the network 102, the problem management system 156 may have assigned the ticket numbers 9878 and 9879 to be worked independently of each other.

However, because the data analysis tool 152 identifies that the physical port 326 is partitioned to provide the partitioned voice and data logical ports 328, the data analysis tool 152 associates the ticket number 9878 for the partitioned logical voice port with the ticket number 9879 for the partitioned logical data port in the ticket column 302 for the port 326. The cause of the problem for the ticket numbers 9878 and 9879 may be related to the physical port 326 that is partitioned into the partitioned logical voice and data ports 328. A user of the system 100 may view the frame 300 to identify the association between the ticket numbers 9878 and 9879 to troubleshoot these associated tickets in a coordinated manner by reassigning the first problem ticket or the second problem ticket to a technician to work on both problem tickets. Additionally, the data analysis tool 152 may provide the association between the ticket numbers 9878 and 9879 to the problem management system 156 to enable the assignment of troubleshooting these associated tickets in a coordinated manner.

In yet another example, the port 330 is a physical port that provides communication to an external network, and the port 332 is a physical port that provides communication to a customer's internal network. The data analysis tool 152 generated ticket number 9870 for the port 330 when the communication speed for the port 330 dropped below a predetermined threshold level. The problem management system 156 generated ticket number 9871 for the port 332 when a customer at 1 Boxridge Drive called in a problem with the internal network. Because the problem management system 156 has no knowledge of the layout for the network 102, the problem management system 156 may have assigned the ticket numbers 9870 and 9871 to be worked independently of each other.

However, because the data analysis tool 152 identifies that the port 330 and the port 332 are part of a user-defined location group 334, the data analysis tool 152 associates the ticket number 9870 for the port 330 with the ticket number 9871 for the port 332 in the ticket column for each port in the user defined location group 334. Although no common cause of the problem for the ticket numbers 9878 and 9879 may exist, the priority may be raised for the technician working on ticket numbers 9878 and 9879 because the ports in the user-defined group 334 constitute 100% of the ports serving the customer at the Boxridge drive location. A user of the system 100 may view the frame 300 to identify the association between the ticket numbers 9870 and 9871 to troubleshoot these associated tickets in a coordinated manner. Additionally, the data analysis tool 152 may provide the association between the ticket numbers 9870 and 9871 to the problem management system 156 to enable the assignment of troubleshooting these associated tickets in a coordinated manner.

The data analysis tool 152 also may determine a customer link diversity 218 for each group, particularly for groups that include ports that are associated with trouble tickets. The customer link diversity 218 is an indication of how much of the customer's communication service is concentrated on a limited number of hardware components. A greater concentration of a customer's communication service on a limited number of hardware components is associated with a higher probability that a hardware failure will impact the customer's communication service. For example, the customer link diversity 218 may indicate if a large percentage of connections for a customer are to any single router, such that the failure of that one router may cause a large number of connections to fail for the customer. The data analysis tool 152 may calculate the customer link diversity 218 for each group based on the integrated database 154 and display these customer link diversities. For example, the data analysis tool 152 may calculate customer link diversities for the groups defined by the supervisor, the technician, and the salesman based on the ports in each group, where some of the groups may include some of the same ports. In another example, the data analysis tool 152 may calculate customer link diversities for the service groups. Each group of ports may have different customer link diversities. Each customer may specify target levels of customer link diversities for any group of ports, and the data analysis tool 152 may recommend reassignment of one or more customer links to increase any customer link diversity 218 for a group of ports when the customer link diversity 218 for the group of ports is less than its corresponding target customer link diversity 228. Each time that a router card is added or a customer link is added, the data analysis tool 152 may recalculate any customer link diversity 218, which facilitates the continual maintenance of each customer link diversity 218 above its corresponding target customer link diversity. Maintaining each customer link diversity 218 above its target results in greater network reliability for customers, which may lead to a greater customer satisfaction, and increased market share for the network service provider that monitors customer link diversity 218 for groups of ports.

The determined customer link diversity 218 may be the router diversity 220, the card diversity 222, the customer locations router diversity 224, and/or the customer locations card diversity 226. The determined customer link diversity 218 may identify potential problems for selected groups of ports. For example, because the supervisor-defined customer group has one customer link between the first router 116 and the first external computer 120 and another customer link between the second router 118 and the second external computer 124, one of the external computers 120 and 124 still will be able to communicate even if either the first router 116 or the second router 118 fails. In another example, because the sale location group has one customer link between the first router 116 and the first external computer 120 and another customer link between the first router 116 and the first internal computer 122, neither of the computers 120 and 122 at the sales center 104 will be able to communicate if the first router 116 fails.

The router diversity 220 is based on a number of customer links on each router. For example, FIG. 1 indicates that the supervisor-defined customer group has a total of five customer links connecting customer computers to routers, one customer link between the routers 116-118 and each of the computers 120-126. In this example, the first external computer 120 and the first internal computer 122 are connected by customer links to the first router 116, resulting in a total of three customer links to the first router 116. Only one of the three customer links connected to the first router 116 is determined to be diverse because ideally each of these three customer links should be connected to a different router, not the same router, which results in a determined diversity of one customer link for the first router 116. Continuing this example, the second external computer 124 and the second internal computer 126 are both connected by customer links to the second router 118, resulting in a total of two customer links to the second router 118. Only one of the two customer links connected to the second router 118 is determined to be diverse because ideally both of these two customer links should be connected to a different router, not the same router, which results in a determined diversity of one customer link for the second router 118.

The router diversity 220 equals the total number of customer links determined to be diverse for the routers divided by the total number of customer links for the routers. For this example, one customer link is determined to be diverse for the first router 116 and one customer link is determined to be diverse for the second router 118, which results in a total of two customer links determined to be diverse for the routers. Because the supervisor-defined customer group has a total of two customer links determined to be diverse for the routers and a total of five customer links for the routers, two diverse links divided by five total links results in the router diversity 220 of 40% for the supervisor-defined customer group.

In another example of router diversity 220, FIG. 1 indicates that the salesman-defined customer network group has a total of two customer links connecting customer computers to routers, one customer link between the routers 116-118 and each of the first internal computer 122 and the second internal computer 126. In this example, the first internal computer 122 is connected by a customer link to the first router 116, resulting in a total of one customer link to the first router 116. The only customer link connected to the first router 116 is determined to be diverse because the only customer link is connected to one router, which results in a determined diversity of one customer link for the first router 116. Continuing this example, the second internal computer 126 is connected by a customer link to the second router 118, resulting in a total of one customer link to the second router 118. The only customer link connected to the second router 118 is determined to be diverse because the only customer link is connected to one router, which results in a determined diversity of one customer link for the second router 118.

For this example, one customer link is determined to be diverse for the first router 116, and one customer link is determined to be diverse for the second router 118, which results in a total of two customer links determined to be diverse for the routers. Because the salesman-defined customer network group has a total of two customer links determined to be diverse for the routers and a total of two customer links for the routers, two diverse links divided by two total links results in the router diversity 220 of 100% for the salesman-defined customer network group.

The card diversity 222 is based on a number of customer links on each card. Multiple customer links terminate on the same router for customers with a large number of customer links. Therefore, the card diversity 222 may improve through connecting customer links on different cards in the same router. For example, FIG. 1 indicates that the supervisor-defined customer group has total of five customer links connecting customer computers to cards, customer links between the cards 132-136 and each of the computers 120-126.

In this example, the first external computer 120 is connected by two customer links to the first card 132. Only one of the two customer links connected to the first card 132 is determined to be diverse because ideally each of these two customer links should be connected to a different card, not the same card, which results in a determined diversity of one customer link for the first card 132. Continuing this example, the first internal computer 122 is connected by a customer link to the second card 134, resulting in a total of one customer link to the second card 134. The only customer link connected to the second card 134 is determined to be diverse because the only customer link is connected to one card, which results in a determined diversity of one customer link for the second card 134.

Further to this example, the second external computer 124 and the second internal computer 126 are both connected by customer links to the third card 136, resulting in a total of two customer links to the third card 136. Only one of the two customer links connected to the third card 136 is determined to be diverse because ideally both of these two customer links should be connected to a different card, not the same card, which results in a determined diversity of one customer link for the third card 136.

The card diversity 222 equals the total number of customer links determined to be diverse for the cards divided by the total number of customer links for the cards. For example, one customer link is determined to be diverse for the first card 132, one customer link is determined to be diverse for the second card 134, and one customer link is determined to be diverse for the third card 136, which results in a total of three customer links determined to be diverse for the cards. Because the supervisor-defined customer group has a total of three customer links determined to be diverse for the cards and a total of five customer links for the cards, three diverse links for the cards divided by five total links for the cards results in the card diversity 220 of 60.0% for the supervisor-defined customer group.

In another example of card diversity 222, FIG. 1 indicates that the distribution location group has a total of two customer links connecting customer computers to cards, one customer link between the third card 136 and each of the computers 124-126. In this example, the second external computer 124 and the second internal computer 126 are connected by customer links to the third card 136, resulting in a total of two customer links to the third card 136. Only one of the two customer links connected to the third card 136 is determined to be diverse because ideally both of these customer links should be connected to a different card, not the same card, which results in a determined diversity of one customer link for the third card 136. For this example, one customer link is determined to be diverse for the third card 136. Because the distribution location group has a total of one customer link determined to be diverse for the cards and a total of two customer links for the cards, one diverse links for the cards divided by two total links for the cards results in the card diversity 220 of 50.0% for the distribution location group. In this example, the lower percentage of 50% for the card diversity 220 indicates that the failure of one card, the third card 136, may cause the failure of multiple customer links, which may cause a communication failure for the distribution center 106.

The customer locations router diversity 224 is based on a number of customer links on each router to each specific location. By identifying the street addresses for the customer location, the data analysis tool 152 may determine that a customer has more than one specific customer location in a city. A single specific customer location may have more than one customer link in an effort to improve reliability, i.e., to insure the customer location retains at least one customer link if any of the other customer location links fail. This effort may be for naught if all of the customer links for a specific customer location connect to the same router, because the failure of one router may cause the failure of multiple customer links. For example, because the sales center 104 is connected by three links to the first router 116, only one of the sales center 104 links is diverse. Because the distribution center 106 is connected by two links to the second router 118 routers, only one of the distribution center 106 links is diverse.

The customer locations router diversity 224 equals the total number of customer location links determined to be diverse divided by the total number of customer location links. For example, one customer location link is determined to be diverse for the sales center 104. Because the sales location group has a total of one customer location link determined to be diverse and a total of three customer location links, one diverse link divided by three total links results in the customer locations router diversity 224 of 33.3% for the sales location group. In this example, the lower percentage of 33.3% for the customer locations router diversity 224 indicates that the failure of one router, the first router 116, may cause the failure of multiple customer links, which may cause a communication failure for the sales center 104.

The customer locations card diversity 226 is based on a number of customer links on each card to each specific location. For example, FIG. 1 indicates that the sales location group has a total of three customer links connecting customer computers to cards, customer links between the cards 132-134 and the computers 120-122. The sales center 104 is connected by two links to the first card 132 and by one link to the second card 134. Only one of the two customer links connected to the first card 132 is determined to be diverse because ideally both of these two customer links should be connected to a different card, not the same card, which results in a determined diversity of one customer link for the first card 132. The only customer link connected to the second card 134 is determined to be diverse because the only customer link is connected to one card, which results in a determined diversity of one customer link for the second card 134.

The customer locations card diversity 226 equals the total number of customer links determined to be diverse from each specific location to the cards divided by the total number of customer links. For example, two customer links are determined to be diverse for the sales center 104 to the cards 132-134. Because the sales location group has a total of two customer links determined to be diverse from each specific location to the cards and a total of three customer links, two diverse links divided by three total links results in the customer locations card diversity 224 of 66.6%.

The target customer link diversities 228 is a set of threshold customer link diversities that correspond to each of the customer link diversities that may be determined. For example, the integrated database 154 may include individual target customer link diversities 228 that correspond to each of the router diversity 220, the card diversity 222, the customer locations router diversity 224, and the customer locations card diversity 226 for the supervisor-defined customer group. Continuing this example, the customer Great Gadgets Corporation may specify a target customer link diversity of 40% for the router diversity 220, a target customer link diversity of 50% for the card diversity 222, a target customer link diversity of 60% for the customer locations card diversity 226, and no target customer link diversity for the customer locations router diversity 224. Each customer may specify their own target customer link diversities 228 based on the requirements for the customer. The higher that a customer sets their own target customer link diversities 228, the more changes may need to be made to meet the high target customer link diversities 228, changes that may generate additional expenses for the customer. Each customer may decide how important each type of customer link diversity 218 is for the customer and how much the customer may be willing to pay for maintaining the customer link diversity 218, and then set their own target customer link diversities 228 accordingly. Alternatively, a network service provider may evaluate each type of customer link diversity 218 for a customer and reassign customer links as new network devices are added to the network. The target customer link diversities 228 may be entered into the integrated database 154 for each customer by the customer or by the user of the system 100.

For example, the customer locations router diversity 224 of 33.3% for the sales location group is less than the corresponding target customer router diversity 228 of 60% for the sales location group. The data analysis tool 152 also may evaluate the customer locations card diversity 226 for the sales location group based on potential reassignments of a customer link for the sales location group.

For example, the data analysis tool 152 evaluates the potential reassignment of the customer link for the first internal computer 122 from the third port 142 on the second card 134 on the first router 116 to the sixth port 148 on the third card 136 on the second router 118. Continuing this example, the customer links from the sales center 104 would be customer links to the first router 116 and the second router 118. The first external computer 120 would be connected by two customer links to the first router 116. Only one of the two customer links connected to the first router 116 is determined to be diverse because ideally each of these two customer links should be connected to a different router, not the same router, which results in a determined diversity of one customer link for the first router 116. Continuing this example, the first internal computer 122 would be connected by a customer link to the second router 118, resulting in a total of one customer link to the second router 118. The only customer link connected to the second router 118 for the sales location group is determined to be diverse because the only customer link for the sales location group is connected to one router, which results in a determined diversity of one customer link for the sales location group for the second router 118. Because the sales location group has a total of two customer links determined to be diverse from the sales center 104 location to the routers and a total of three customer links, two diverse links divided by three total links results in the customer locations router diversity 224 of 66.6% for the sales location group.

The evaluation of the potential reassignment of the customer link for the first internal computer 122 determines that the customer locations router diversity 224 of 33.3% for the sales location group may be increased above the target customer link diversities 228 of 60% that corresponds to the customer locations router diversity 224 for the sales location group. The data analysis tool 152 may recommend that a technician unplug the link for the first internal computer 122 from the third port 142 on the second card 134 on the first router 116 and plug the link for the first internal computer 122 to the sixth port 148 on the third card 136 on the second router 118. The data analysis tool 152 also may recommend a reassignment of the customer link for the first internal computer 122 to a router different from the second router 118 in order to maintain the router diversity 220 of 100.0% for the customer network group.

Because the customer link diversity monitoring is ongoing, as the method is repeated periodically, each customer link diversity 218 is automatically updated when the network 102 changes, e.g., when cards are added or when new links are added or removed. The data analysis tool 152 determines the customer link diversity 218 when adding a card and determines the customer link diversity 218 when adding a customer link. A user of the system 100 may instruct the data analysis tool 152 to determine each customer link diversity 218 for each of the user's groups. For example, the data analysis tool 152 determines the card diversity 222 for each group when adding a card to the first router 116. In another example, the data analysis tool 152 determines the router diversity 222 for the sales location group when adding a customer link for another customer computer in the sales center 104. The data analysis tool 152 enables the system 100 to monitor customer link diversity 218 periodically, as customers add customer links and as network service providers add cards and routers to their networks. As the customer link diversity 218 changes for groups, the system 100 recommends reassignment of customer links when a changed customer link diversity 218 is below a target customer link diversity 228 specified by a customer. The system 100 may output a recommendation for a reassignment of a customer link if the reassignment may increase the customer link diversity 218 for a group, or output a notice that current potential reassignments would not increase the customer link diversity 218 for the group.

Figure 4:
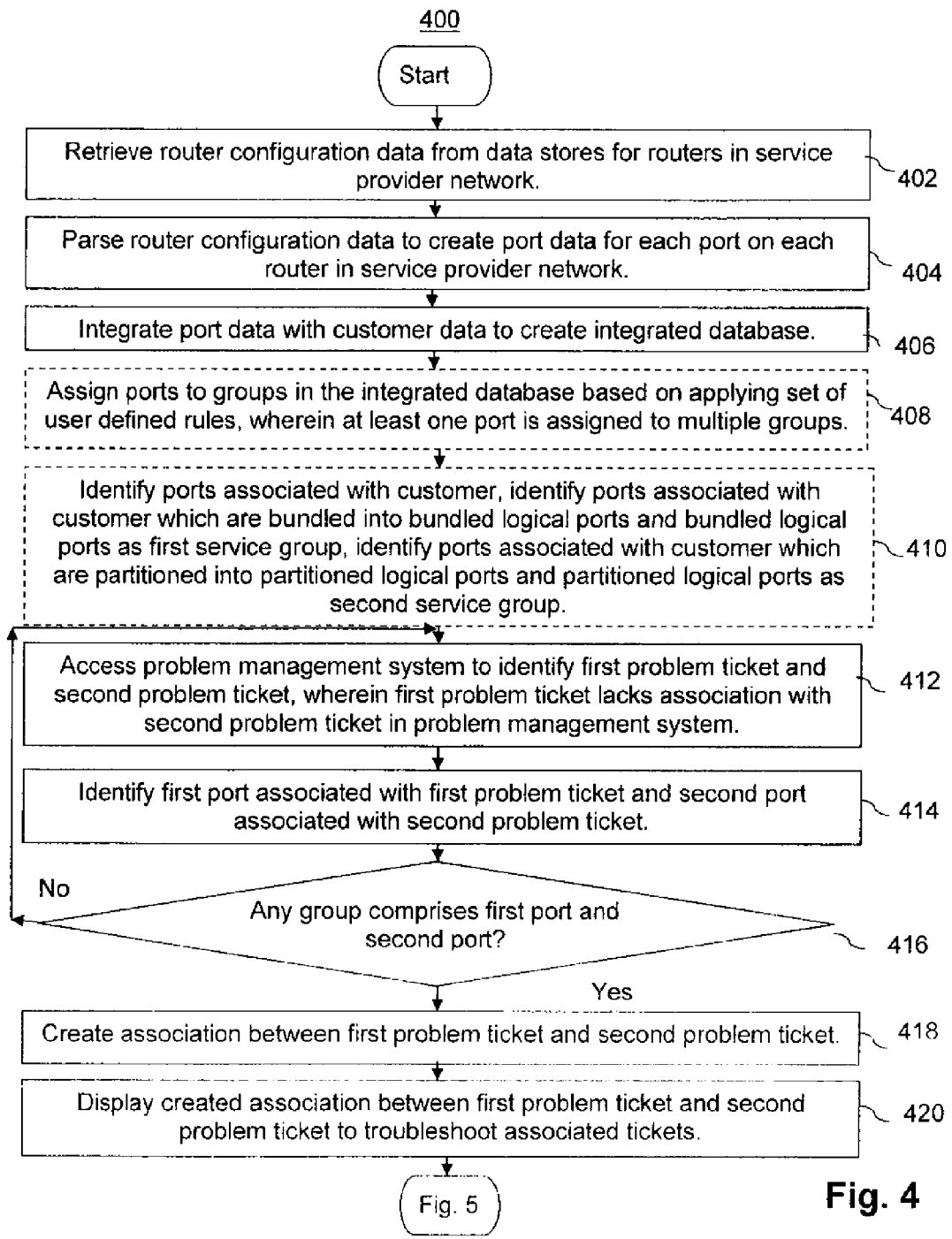
FIG. 4 shows a method for associating problem tickets based on an integrated network and customer database according to some embodiments of the present disclosure.

Turning now to FIG. 4, a method 400 for service grouping in network reporting is depicted according to some embodiments of the present disclosure. Executing the method 400 results in creating a database of port data and customer data, and creating associations between problem tickets for the ports in the database.

In box 402, router configuration data is retrieved from data stores for routers in a service provider network. For example, the data retriever 112 retrieves the router configuration data from the router configuration data stores 128-130 so that the on-line routers are not directly accessed during normal operations.

In box 404, router configuration data is parsed to determine port data for each port on each router in a service provider network. For example, the data retriever 112 retrieves the router data 204 and the database server 108 parses the router data 204 to determine the port data 206 for each port on each router. In another example, the data retriever 112 retrieves the router data 204 and parses the router data 204 to determine the port data 206 for each port on each router.

In box 406, port data is integrated with customer data to create an integrated database. For example, the database server 108 uses the customer name 212 for each port on each router in combination with the customer names lists 208 to integrate the customer data 150 with the network data 114, which includes the port data 206, to create the integrated database 154.

In box 408, ports are optionally assigned to groups in the integrated database based on applying set of user defined rules, wherein at least one port is assigned to multiple groups. For example, the data analysis tool 152 assigns the ports depicted in frame 300 to a Newark city group for the customer and the ports 330-332 to a Boxridge Drive location group for the customer.

In box 410, ports associated with a customer are optionally identified, ports which are bundled into bundled logical ports and the bundled logical ports are optionally identified as bundled service groups, and ports which are partitioned into partitioned logical ports and the portioned logical ports are optionally identified as partitioned logical groups. For example, the data analysis tool 152 identifies the ports 138-148 associated with a customer, identifies the ports 138 and 140 which are bundled into a bundled logical port and the bundled logical port as a bundled service group for the first external computer 120, and identifies the port 146 which is partitioned into partitioned logical ports and the partitioned logical ports as a partitioned service group for the second external computer 124 and the second internal computer 126.

In box 412, a problem management system is accessed to identify a first problem ticket and a second problem ticket, wherein the first problem ticket lacks an association with the second problem ticket in the problem management system. For example, the data analysis tool 152 accesses the problem management system 156 to identify a problem ticket numbered 9870 and a problem ticket numbered 9871, wherein the problem ticket 9870 lacks an association with the problem ticket 9871 in the problem management system 156.

In box 414, an identification is made of a first port associated with a first problem ticket and a second port associated with a second problem ticket. For example, the data analysis tool 152 identifies the port 330 associated with the problem ticket 9870 and the port 332 associated with the problem ticket 9871.

In box 416, a determination is made whether any group comprises the first port and the second port. For example, the data analysis tool 152 determines whether any group includes the ports 330-332. If no group includes the first port and the second port, the method 400 returns to box 412 to continue checking the problem management system 156 for problem tickets. If a group includes the first port and the second port, the method 400 continues to box 418.

In box 418, an association between the first problem ticket and the second problem ticket is created. For example, the data analysis tool 152 creates an association between the problem ticket 9870 and the problem ticket 9871 based on the group 334.

In box 420, a created association between a first problem ticket and a second problem ticket is displayed to troubleshoot associated tickets. For example, the user interface 110 displays the frame 300 to enable the customer to troubleshoot the tickets 9870 and 9871.

Figure 5:
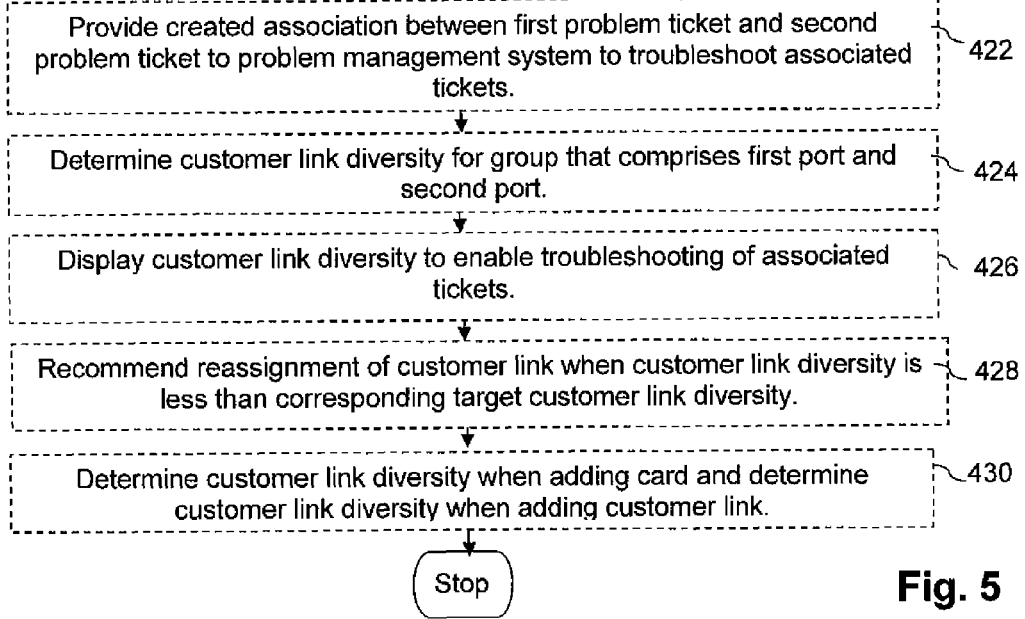
FIG. 5 shows another method for associating problem tickets based on an integrated network and customer database according to some embodiments of the present disclosure.

Turning now to FIG. 5, a method 500 for service grouping in network reporting is depicted according to some embodiments of the present disclosure. Executing the method 500 results in determining and displaying customer link diversity to enable troubleshooting of associated tickets.

In box 422, a created association between a first problem ticket and a second problem ticket is optionally provided to a problem management system to troubleshoot associated tickets. For example, the data analysis tool 152 provides the created association between the problem ticket 9870 and the problem ticket 9871 to the problem management system 156 to troubleshoot the tickets 9870 and 9871 in a coordinated manner.

In box 424, a data analysis tool optionally determines each customer link diversity for each customer based on the integrated database. For example, the data analysis tool 152 calculates the customer locations router diversity 224 of 33.3% for the sales location group.

In box 426, a data analysis tool optionally displays each customer link diversity for a customer specified through a user interface. A user may instruct the data analysis tool 152 to determine a specific customer link diversity 218 for a specific customer. For example, the user interface 110 displays the locations router diversity 224 of 33.3% for the sales location group to a user.

In box 428, a data analysis tool optionally recommends a reassignment of a customer link when a customer link diversity is less than a target customer link diversity. For example, the data analysis tool 152 recommends a reassignment of reassignment of the customer link for the first internal computer 122 because the locations router diversity 224 of 33.3% for the sales location group is less than the corresponding target customer link diversity of 60% for the sales location group.

In box 430, a customer link diversity is determined when adding card and adding a customer link. For example, the data analysis tool 152 recalculates the customer locations router diversity 224 of 66.6% for the sales location group after reassigning a customer link.

Figure 6:
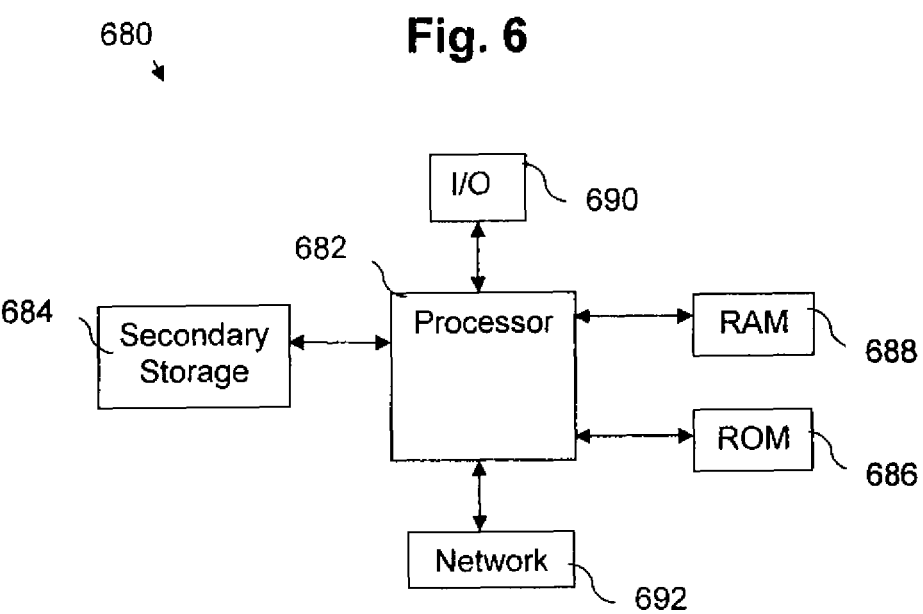
FIG. 6 illustrates an exemplary computer system suitable for implementing the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 692 may enable the processor 682 to communicate with an internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein

What is claimed is:

1. A system for associating problem tickets based on an integrated network and customer database, comprising:
   a processor;
   a data retriever that, when executed by the processor, retrieves router configurations from data stores for routers in a service provider network;
   a data analysis tool that, when executed by the processor,
      parses the router configurations to create port data for each port on each router in the service provider network, wherein the port data for each port on each router includes a customer name,
      integrates the port data with customer data to create an integrated database, wherein each customer data is associated with one of a plurality of customers, and wherein the integrating comprises matching the customer name included in the port data for each port to a corresponding one of the plurality of customers associated with each customer data,
      assigns a plurality of ports to a plurality of user defined groups in the integrated database based on applying a set of user defined rules, wherein at least one of the plurality of ports is assigned to multiple user defined groups,
      accesses a problem management system to identify a first problem ticket and a second problem ticket, wherein the first problem ticket lacks an association with the second problem ticket in the problem management system, and wherein the first problem ticket and the second problem ticket are different tickets associated with different problems,
      identifies a first port associated with the first problem ticket and a second port associated with the second problem ticket, wherein the first port and the second port are different physical or logical ports,
      determines whether one of the plurality of user defined groups comprises the first port and the second port, and
      creates an association between the first problem ticket and the second problem ticket in response to a determination that the one of the plurality of user defined groups comprises the first port and the second port; and
   a user interface that, when executed by the processor, displays the created association between the first problem ticket and the second problem ticket to troubleshoot associated tickets.

2. The system of claim 1, wherein the data analysis tool assigns a port to a group if one of each rule in the set of user defined rules applies to the port and one of the set of user defined rules applies to the port.

3. The system of claim 1, wherein the set of user defined rules identifies ports for exclusion from a group.

4. The system of claim 1, wherein the set of user defined rules is based on at least one of a customer full name, a customer short name, a remote side internet protocol address, a network address number, a private line number, an interface description, a remote border gateway protocol autonomous system number, a router and interface name, a support office indicator code, and a multi protocol label switching virtual routing and forwarding name.

5. The system of claim 1, wherein the set of user defined rules is based on a user identification of individual ports, wherein the system creates a rule that corresponds to the individual ports.

6. The system of claim 1, wherein the first problem ticket is based on one of a first current problem and a first historical problem for which the first problem ticket is completed and the second problem ticket is based on one of a second current problem and a second historical problem for which the second problem ticket is completed.

7. The system of claim 1, wherein the data analysis tool further provides the created association between the first problem ticket and the second problem ticket to the problem management system to troubleshoot associated tickets.

8. The system of claim 1, wherein troubleshooting associated tickets comprises at least one of making an assignment that comprises the first problem ticket and the second problem ticket, identifying a common solution for the first problem ticket and the second problem ticket, changing a priority for at least one of the first problem ticket and the second problem ticket, and reassigning one of the first problem ticket and the second problem ticket.

9. A computer implemented method for associating problem tickets based on an integrated network and customer database, comprising:
retrieving router configurations from data stores for routers in a service provider network;
parsing the router configurations to create port data for each port on each router in the service provider network, wherein the port data for each port on each router includes a customer name;
integrating the port data with customer data to create an integrated database, wherein each customer data is associated with one of a plurality of customers, and wherein the integrating comprises matching the customer name included in the port data for each port to a corresponding one of the plurality of customers associated with each customer data;
assigning a plurality of ports to a plurality of user defined groups in the integrated database based on applying a set of user defined rules, wherein at least one of the plurality of ports is assigned to multiple user defined groups;
accessing a problem management system to identify a first problem ticket and a second problem ticket, wherein the first problem ticket lacks an association with the second problem ticket in the problem management system, and wherein the first problem ticket and the second problem ticket are different tickets associated with different problems;
identifying a first port associated with the first problem ticket and a second port associated with the second problem ticket, wherein the first port and the second port are different physical or logical ports;
determining whether one of the plurality of user defined groups comprises the first port and the second port;
creating an association between the first problem ticket and the second problem ticket in response to a determination that the one of the plurality of user defined groups comprises the first port and the second port; and
displaying the created association between the first problem ticket and the second problem ticket to troubleshoot associated tickets.

10. The computer implemented method of claim 9, further comprising:

determining a customer link diversity for a group that comprises the first port and the second port; and
displaying the customer link diversity to enable troubleshooting of associated tickets.

11. The computer implemented method of claim 10, further comprising recommending reassignment of a customer link when the customer link diversity is less than a corresponding target customer link diversity.

12. The computer implemented method of claim 10, wherein the customer link diversity comprises a router diversity based on a number of customer links on each router.

13. The computer implemented method of claim 10, wherein the customer link diversity comprises a card diversity based on a number of customer links on each card.

14. The computer implemented method of claim 10, wherein the customer link diversity comprises a customer locations router diversity based on a number of customer links on each router to each location.

15. The computer implemented method of claim 10, wherein the customer link diversity comprises a customer locations card diversity based on a number of customer links on each card to each location.

16. The computer implemented method of claim 10, further comprising determining the customer link diversity when adding a card and determining the customer link diversity when adding a customer link.

17. A system for associating problem tickets based on an integrated network and customer database, comprising:
a processor;
a data retriever that, when executed by the processor, retrieves router configurations from data stores for routers in a service provider network;
a data analysis tool that, when executed by the processor,
parses the router configurations to create port data for each port on each router in the service provider network, wherein the port data for each port on each router includes a customer name,
integrates the port data with customer data to create an integrated database, wherein each customer data is associated with one of a plurality of customers, and wherein the integrating comprises matching the customer name included in the port data for each port to a corresponding one of the plurality of customers associated with each customer data,
identifies ports associated with a customer,
identifies the ports associated with the customer which are bundled into bundled logical ports as a first service group,
identifies the ports associated with the customer which are partitioned into partitioned logical ports as a second service group,
accesses a problem management system to identify a first problem ticket and a second problem ticket, wherein the first problem ticket lacks an association with the second problem ticket in the problem management system, and wherein the first problem ticket and the second problem ticket are different tickets associated with different problems,
identifies a first port associated with the first problem ticket and a second port associated with the second problem ticket, wherein the first port and the second port are different physical or logical ports,
determines whether one of the first service group and the second service group comprises both the first port and the second port, and
creates an association between the first problem ticket and the second problem ticket in response to a determination that one of the first service group and the second service group comprises both the first port and the second port; and a user interface that, when executed by the processor, displays the created association between the first problem ticket and the second problem ticket to troubleshoot associated tickets.

18. The system of claim 17, wherein one of the first service group and the second service group comprises a parent port that comprises a child port, wherein a determination of the parent port and the child port is based on a service provided to the customer, wherein the parent port comprises a port selected from the ports associated with the customer, the bundled logical ports, and the partitioned logical ports, and the child port comprises a different port selected from the ports associated with the customer, the bundled logical ports, and the partitioned logical ports.

19. The system of claim 17, wherein one of the first service group and the second service group comprises a first peer port that relates to a second peer port based on a service provided to the customer, wherein the first peer port comprises a port selected from the ports associated with the customer, the bundled logical ports, and the partitioned logical ports, and the second peer port comprises a different port selected from the ports associated with the customer, the bundled logical ports, and the partitioned logical ports.

20. The system of claim 19, wherein the first peer port comprises a port associated with inbound communications for a gateway and the second peer port comprises a port associated with outbound communications for the gateway.

* * * * *